United States Patent
Kim et al.

(10) Patent No.: US 9,167,464 B2
(45) Date of Patent: Oct. 20, 2015

(54) METHOD FOR REPORTING MEASUREMENT INFORMATION OF TERMINAL IN WIRELESS COMMUNICATION SYSTEM AND APPARATUS THEREFOR

(75) Inventors: Sangwon Kim, Gyeonggi-do (KR); Sunghoon Jung, Gyeonggi-do (KR); Youngdae Lee, Gyeonggi-do (KR); Seungjune Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 13/983,311

(22) PCT Filed: Feb. 16, 2012

(86) PCT No.: PCT/KR2012/001159
§ 371 (c)(1),
(2), (4) Date: Aug. 2, 2013

(87) PCT Pub. No.: WO2012/111984
PCT Pub. Date: Aug. 23, 2012

(65) Prior Publication Data
US 2013/0308548 A1    Nov. 21, 2013

Related U.S. Application Data

(60) Provisional application No. 61/445,509, filed on Feb. 22, 2011, provisional application No. 61/444,300, filed on Feb. 18, 2011.

(51) Int. Cl.
*H04W 24/10* (2009.01)

(52) U.S. Cl.
CPC .................................... *H04W 24/10* (2013.01)

(58) Field of Classification Search
CPC ...................................................... H04W 24/10
See application file for complete search history.

(56) References Cited

U.S. PATENT DOCUMENTS

| 2009/0109939 | A1 | 4/2009 | Bhushan et al. |
| 2009/0175292 | A1 | 7/2009 | Noh et al. |
| 2009/0191875 | A1* | 7/2009 | Vujcic et al. ................... 455/436 |
| 2009/0203384 | A1* | 8/2009 | Vujcic ........................... 455/450 |

(Continued)

FOREIGN PATENT DOCUMENTS

| CN | 101836491 A | 9/2010 |
| CN | 102413548 A | 4/2012 |

(Continued)

OTHER PUBLICATIONS

Written Opinion issued in corresponding International Patent Application No. PCT/KR2012/001159 dated Sep. 26, 2012.

(Continued)

*Primary Examiner* — Brian D Nguyen
(74) *Attorney, Agent, or Firm* — Morgan, Lewis & Bockius LLP

(57) ABSTRACT

The present invention relates to a method for enabling a terminal to process a signal in a wireless communication system. Specifically, the method includes the steps of: selecting a cell according to a measurement based on a first subframe pattern; transmitting a first message to the cell; and receiving a second message from the cell on the basis of a second sub-frame pattern, wherein the first message indicates that the measurement is performed on the basis of the first sub-frame pattern.

5 Claims, 15 Drawing Sheets

(56) References Cited

U.S. PATENT DOCUMENTS

| | | | |
|---|---|---|---|
| 2009/0316586 A1* | 12/2009 | Yi et al. | 370/242 |
| 2010/0067470 A1* | 3/2010 | Damnjanovic et al. | 370/329 |
| 2010/0074130 A1* | 3/2010 | Bertrand et al. | 370/252 |
| 2010/0195618 A1 | 8/2010 | Park et al. | |
| 2010/0210243 A1* | 8/2010 | Vujcic | 455/411 |
| 2011/0032855 A1 | 2/2011 | Kim et al. | |
| 2011/0158104 A1* | 6/2011 | Frenger et al. | 370/241 |
| 2011/0268085 A1* | 11/2011 | Barany et al. | 370/331 |
| 2012/0002006 A1* | 1/2012 | Kim et al. | 348/42 |
| 2012/0071200 A1* | 3/2012 | Bienas et al. | 455/525 |
| 2012/0127930 A1* | 5/2012 | Nguyen et al. | 370/329 |

FOREIGN PATENT DOCUMENTS

| | | |
|---|---|---|
| KR | 10-2009-0030907 A | 3/2009 |
| KR | 10-2009-0074106 A | 7/2009 |
| KR | 10-2009-0112574 A | 10/2009 |

OTHER PUBLICATIONS

International Search Report issued in corresponding International Patent Application No. PCT/KR2012/001159 dated Sep. 26, 2012.
Office Action dated May 5, 2015, issued by the State Intellectual Property Office of China in Chinese Patent Application No. 201280009308.1.

* cited by examiner

FIG. 3
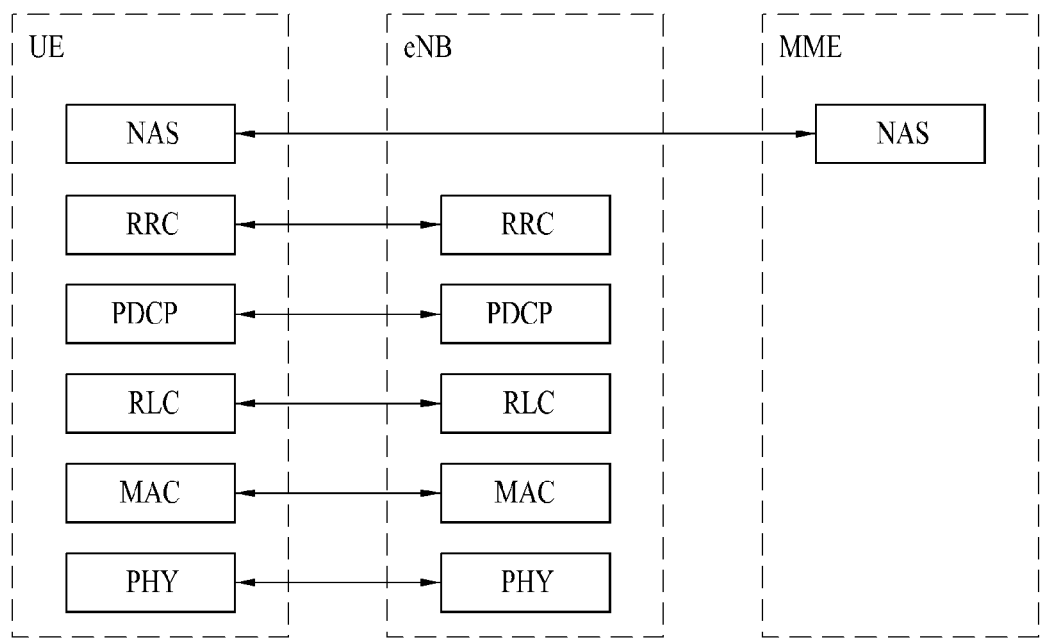
(a) control plane protocol stack
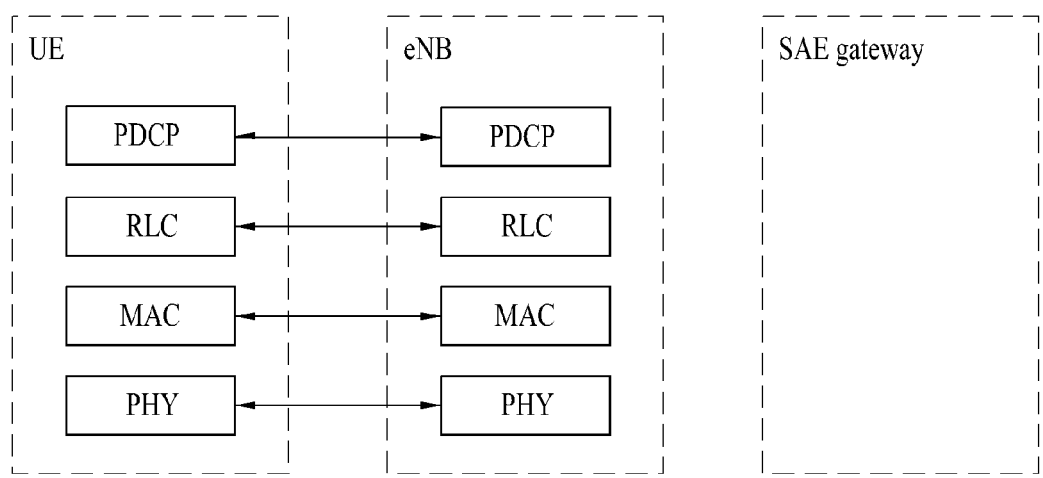
(b) user plane protocol stack

METHOD FOR REPORTING MEASUREMENT INFORMATION OF TERMINAL IN WIRELESS COMMUNICATION SYSTEM AND APPARATUS THEREFOR

TECHNICAL FIELD

The present invention relates to a wireless communication system, and more particularly, to a method of reporting measurement information, which is reported by a user equipment in a wireless communication system and apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE (long term evolution) system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of reporting measurement information, which is reported by a user equipment in a wireless communication system and an apparatus therefore in the following description based on the discussion mentioned in the foregoing description.

Technical Solution

To achieve these and other advantages and in accordance with the purpose of the present invention, as embodied and broadly described, a method of processing a signal, which is processed by a user equipment in a wireless communication system includes the steps of selecting a cell according to measurement based on a first subframe pattern, transmitting a first message to the cell, and receiving a second message from the cell based on a second subframe pattern, wherein the first message indicates that the measurement is performed based on the first subframe pattern.

Preferably, at least one subframe designated to measure the user equipment in the first subframe pattern corresponds to a subframe to which a data is not transmitted from a cell adjacent to the cell. More preferably, at least one subframe designated to measure the user equipment in the second subframe pattern corresponds to the subframe to which a data is not transmitted from the cell adjacent to the cell. The first subframe pattern may be identical to the second subframe pattern.

Meanwhile, the first message may correspond to one of an RRC connection request message, an RRC connection setup complete message, and an RRC connection reestablishment complete message.

Or, the first message may correspond to a random access preamble defined by a UE-specific random access resource. In this case, preferably, the method further includes the step of receiving information on the UE-specific random access resource from the cell.

Meanwhile, the method may further include the step of receiving information on the first subframe pattern from the cell or a cell adjacent to the cell. Moreover, the method may further include the step of receiving information on the second subframe pattern from the cell or the cell adjacent to the cell. In this case, more preferably, the first message further includes information on the first subframe pattern.

Meanwhile, the second message corresponds to a response message for the first message or a data.

Advantageous Effects

According to embodiment of the present invention, when a user equipment attempts to access an interfered cell, since the user equipment is able to inform the interfered cell of whether the user equipment corresponds to an interfered user equipment, interference from an interfering cell can be reduced while an access is established between an interfered user equipment and the interfered cell.

Effects obtainable from the present invention may be non-limited by the above mentioned effects. And, other unmentioned effects can be clearly understood from the following description by those having ordinary skill in the technical field to which the present invention pertains.

DESCRIPTION OF DRAWINGS

FIG. 3 is a diagram for structures of control and user planes of radio interface protocol between a 3GPP radio access network standard-based user equipment and E-UTRAN;

BEST MODE

Mode For Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
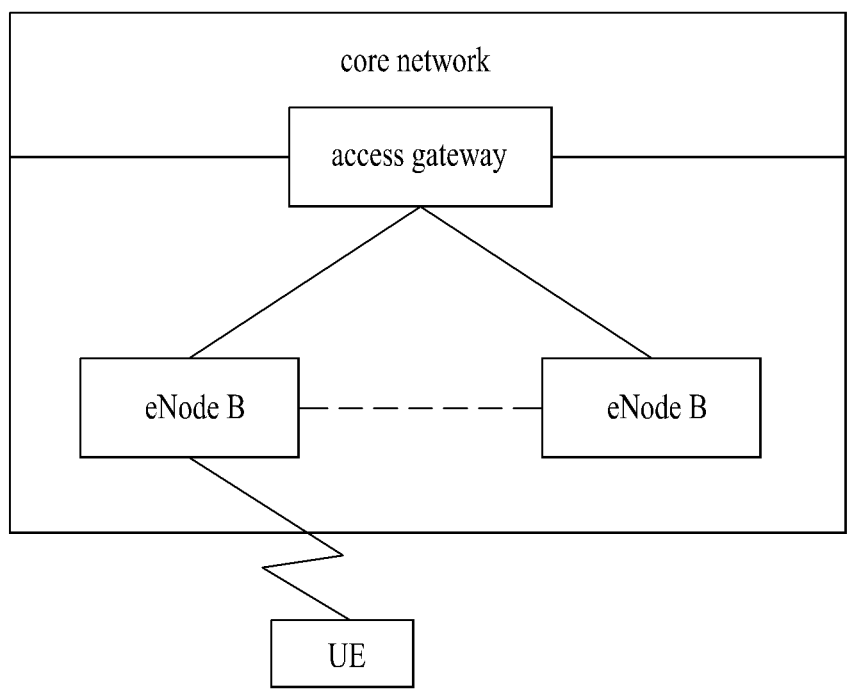
FIG. 1 is a schematic diagram of E-UMTS network structure as one example of a wireless communication system.
Figure 2:
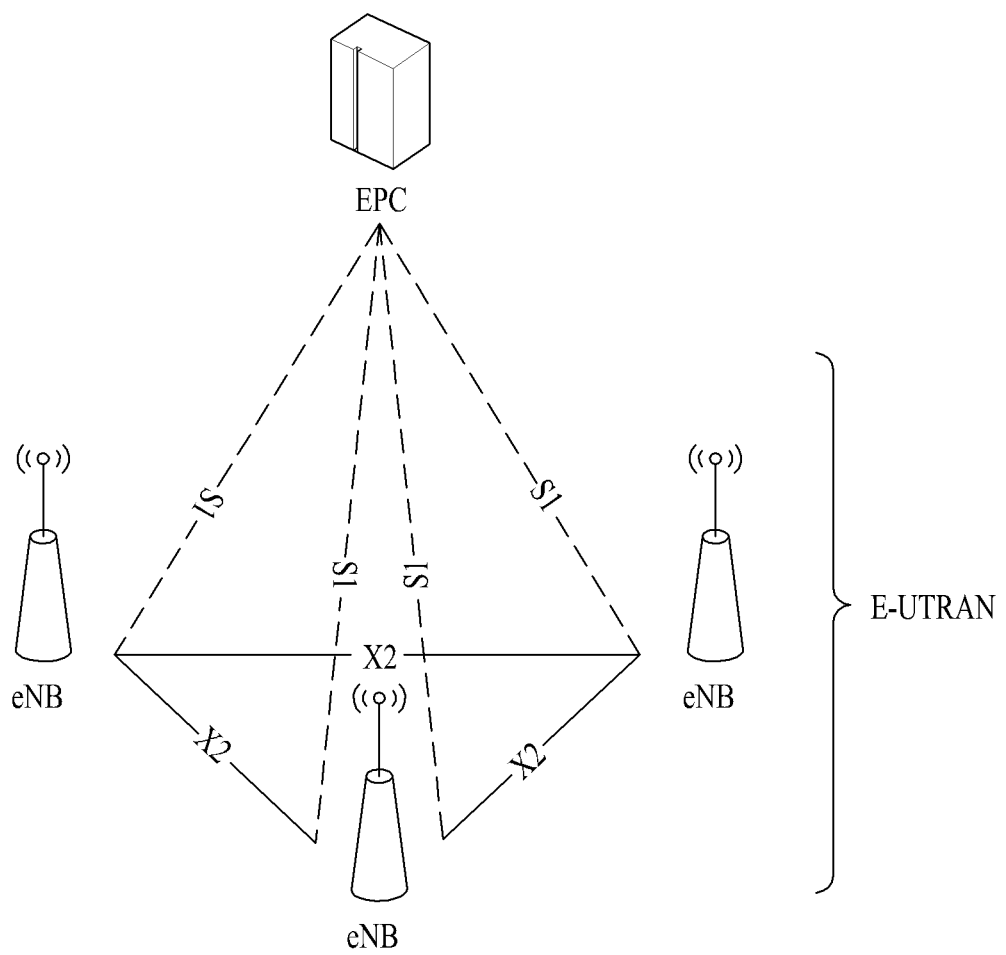
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
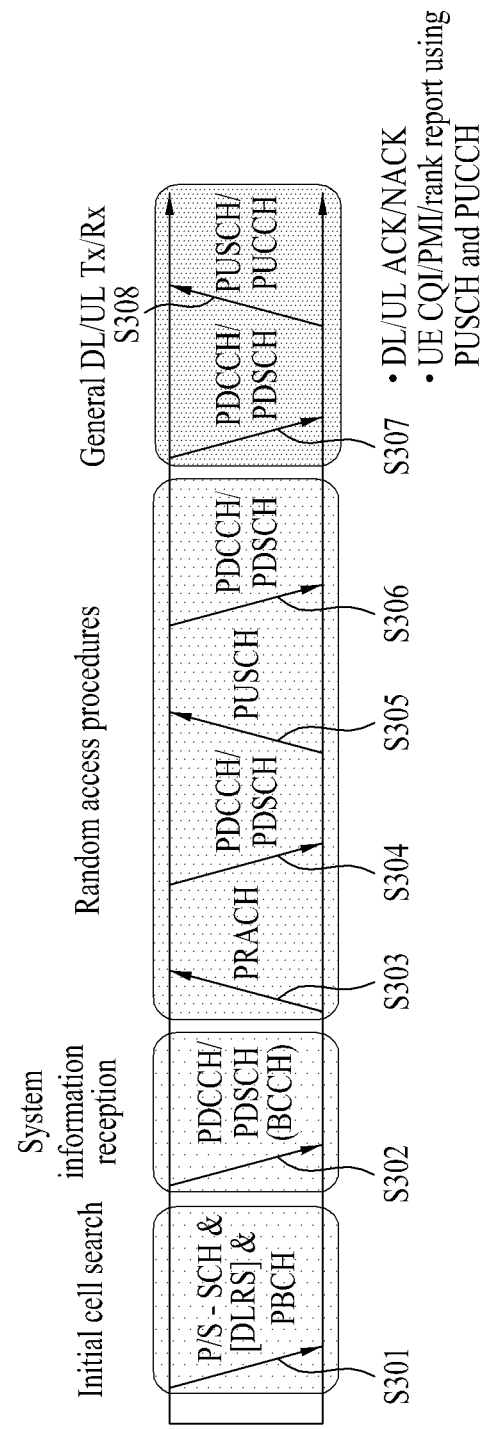
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and information carried on the physical downlink control channel (PDCCH). The user equipment may be then able to obtain more detailed system information [S302].

Meanwhile, if a user equipment initially accesses an eNode B or does not have a radio resource for transmitting a signal, the user equipment may be able to perform a random access procedure to complete the access to the base station [S303 to S306]. To this end, the user equipment may transmit a specific sequence as a preamble on a physical random access channel (PRACH) [S303 and S305] and may be then able to receive a response message on PDCCH and the corresponding PDSCH in response to the preamble [S304 and S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
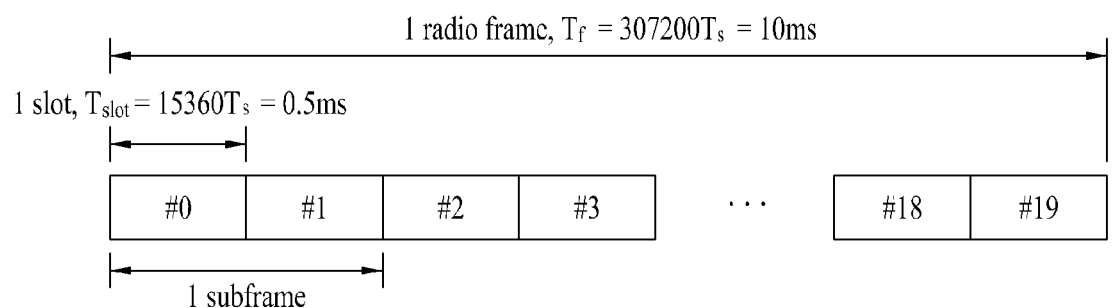
FIG. 5 is a diagram for a structure of a radio frame in LTE system.

FIG. 5 is a diagram for a structure of a radio frame used in an LTE system.

Referring to FIG. 5, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Figure 6:
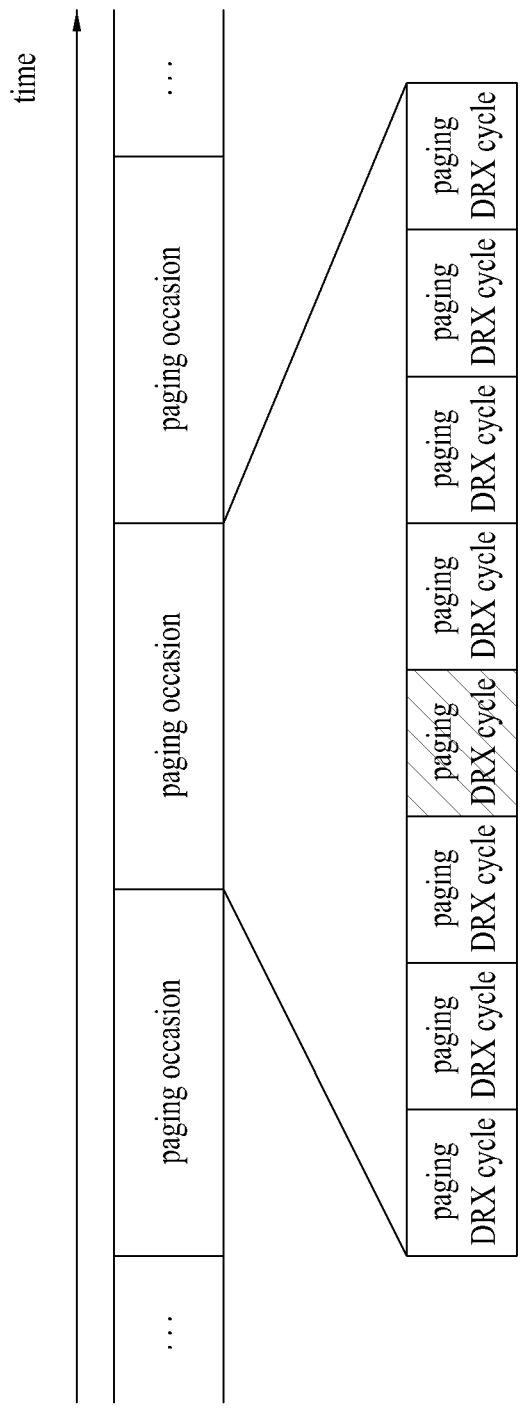
FIG. 6 is a diagram for explaining a general transceiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information a user equipment should know to access a network. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In the following description, a cell selection and reselection procedures are explained.

First of all, if a power of a user equipment is turned on, the user equipment should perform preparation procedures to receive a service in a manner that the user equipment selects a cell having an appropriate quality. The user equipment in an idle state should be ready to receive a service from a corresponding cell in a manner that the user equipment selects a cell having an appropriate quality all the time. For instance, the user equipment whose power has been just turned on should select a cell having an appropriate quality to register for a network. When the user equipment in RRC_CONNECTED state enters a state of RRC_IDLE, the user equipment should select a cell to stay therein in RRC_IDLE state. Thus, in order for the user equipment to stay in such a service-standby state as an RRC_IDLE state, a procedure for selecting a cell that meets a specific condition is called a cell selection. Since the cell selection is currently performed under a condition that the user equipment has not determine a cell to stay therein in the RRC_IDLE state yet, a most significant point is to select a cell as quickly as possible. Therefore, if a cell provides a radio signal quality equal to or greater than a prescribed reference, although the cell fails in providing a best radio signal quality to the user equipment, the cell can be selected in the cell selection procedure performed by the user equipment.

If the user equipment selects a cell that meets a cell selection reference, the user equipment receives information necessary for operations in RRC_IDLE state of the user equipment in the corresponding cell from system information of the corresponding cell. Having received all informations necessary for the operations in RRC_IDLE state, the user equipment makes a request for a service to a network or stands by in RRC_IDLE state to receive a service from the network.

After the user equipment has selected a specific cell through the cell selection procedure, a strength or quality of a signal between the user equipment and an eNode B may change due to a mobility of the user equipment, a change of a radio environment or the like. Hence, in case that the quality of the selected cell is degraded, the user equipment may be able to select a different cell providing a better quality. Thus, in case of selecting a cell again, the user equipment selects a cell providing a signal quality better than that of a currently selected cell in general. This procedure is called a cell reselection. In aspect of a quality of a radio signal, the basic object of the cell reselection procedure is to select a cell providing a best quality to the user equipment in general. Aside from the aspect of the quality of the radio signal, a network determines a priority per frequency and may then inform the user equipment of the determined priority. Having received this priority, the user equipment may preferentially consider the received priority in a cell reselection procedure other than a radio signal quality reference.

In the following description, a random access (RA) procedure provided by an LTE system is explained. First of all, the random access procedure provided by the LTE system is classified into a contention based random access procedure or a non-contention based random access procedure. The classification into the contention based random access procedure or the non-contention based random access procedure is determined depending on whether a random access preamble used for the random access procedure is directly selected by a user equipment or an eNode B.

In the non-contention based random access procedure, the user equipment may use a random access preamble directly assigned to the user equipment by the eNode B. Hence, if the eNode B assigned the specific random access preamble to the user equipment only, the random access preamble received from the eNode B may be used by the user equipment only and other user equipments do not use the random access preamble. Therefore, since 1-to-1 relationship between the random access preamble and the user equipment using the random access preamble is established, contention may be regarded as non-existing. In doing so, since the eNode B is able to know which user equipment has transmitted the random access preamble as soon as receives the random access preamble, this case may be regarded as efficient.

On the other hand, in the contention based random access procedure, since the eNode B transmits a random access preamble in a manner of randomly selecting the corresponding preamble from the random access preambles available for the user equipment, there exists a possibility that a plurality of user equipments may use the same random access preamble all the time. Therefore, although the eNode B receives a specific random access preamble, the eNode B is unable to know which user equipment has transmitted the random access preamble.

A case for a user equipment to perform a random access procedure include one of: 1) a case of performing an initial access due to having no connection (RRC connection) with an eNode B; 2) a case of an initial access to a target cell in the course of a handover; 3) a case of being requested by a command of the eNode B; 4) a case of UL data occurrence in a situation that a UL time synchronization is not matched or a designated radio resource used for making a request for a radio resource is not allocated; and 5) a case of a recovery procedure for a radio link failure or a handover failure.

Figure 7:
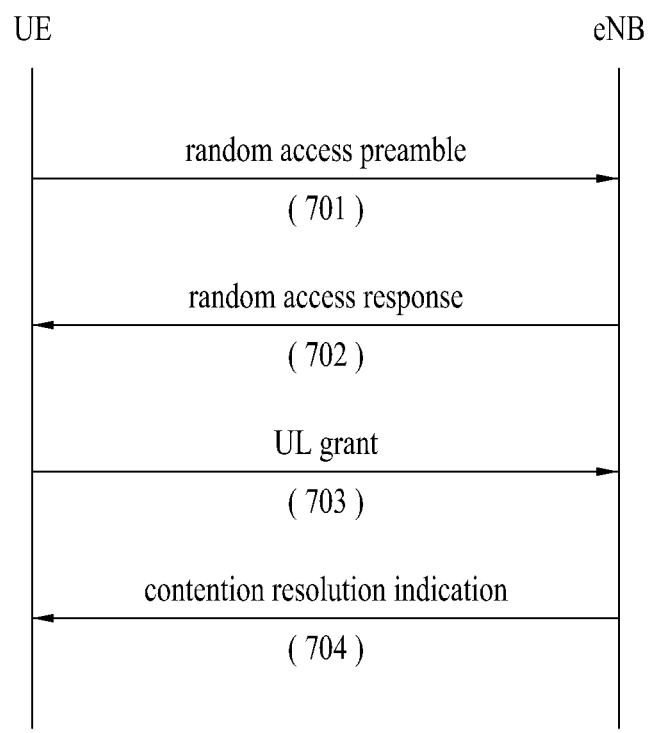
FIG. 7 is a diagram of an operating process between a user equipment (UE) and an eNode B (eNB) in a contention based random access procedure provided by LTE system.

FIG. 7 is a diagram of an operating process between a user equipment (UE) and an eNode B (eNB) in a contention based random access procedure provided by LTE system.

Referring to FIG. 7, in the step S701, a user equipment randomly selects a random access preamble from a set of random access preambles indicated by system information or a handover command, selects a PRACH resource for carrying the random access preamble, and then transmits the selected random access preamble thereon. In this case, the preamble is called a RACH MSG 1.

In a step S702, after the user equipment has transmitted the random access preamble, the user equipment attempts a reception of its random access response in a random access response receiving window indicated by an eNode B through the system information or the handover command. In particular, RACH MSG 2 (i.e., the random access response information) may be transmitted in form of MAC PDU and the MAC PDU may be delivered on PDSCH. In particular, in order for the user equipment to receive the information delivered on the PDSCH properly, PDCCH is also delivered together. In particular, information on the user equipment necessary to receive the PDSCH, a frequency and time information of a radio resource of the PDSCH, a transmission format of the PDSCH and the like may be included in the PDCCH. Once the user equipment succeeds in the reception of the PDCCH transmitted to the user equipment, it may be able to appropriately receive a random access response carried on the PDSCH in accordance with the informations of the PDCCH. And, the random access response may include a random access preamble identifier, a UL grant, a temporary C-RNTI, a time synchronization correction value (time alignment command), and the like. The reason for requiring the random access preamble identifier in the foregoing description is, since one random access response may be able to contain random access response information for at least one or more user equipments, to indicate that each of the UL grant, the temporary C-RNTI and the time synchronization correction value are valid for which user equipment. The random access preamble identifier matches the random access preamble selected by the user equipment in the step S701.

Subsequently, in a step S703, if the user equipment receives the random access response valid for the user equipment itself, the user equipment may separately process the informations included in the random access response. In particular, the user equipment applies the time synchronization correction value and saves the temporary C-RNTI. Moreover, the user equipment transmits a data stored in a buffer of the user equipment or a newly created data to the eNode B using the UL grant. In this case, the data transmitted via the UL grant, i.e., MAC PDU is named a RACH MSG 3. It is mandatory for the data included in the UL grant to contain an identifier of the user equipment. In particular, since in the contention based random access procedure, the eNode B is unable to determine which user equipments perform the random access procedure, the eNode B should identify a user equipment to resolve a future contention. In order to have a user equipment identifier contained, two kinds of methods are available as follows. First of all, according to a $1^{st}$ method, if a user equipment has a valid cell identifier already assigned by a corresponding cell prior to the random access procedure, the user equipment transmits its cell identifier via the UL grant. On the contrary, if the user equipment fails to receive the assignment of a valid cell identifier prior to the random access procedure, the user equipment transmits its unique identifier. In general, the unique identifier is longer than the cell identifier. If the user equipment transmits data via the UL grant, the user equipment initiates a contention resolution timer.

Finally, after the user equipment has transmitted the data containing the identifier of its own via the UL grant included in the random access response, the user equipment waits for an instruction from the eNode B for the contention resolution. In particular, the user equipment may attempt a reception of PDCCH to receive a specific message. In receiving the PDCCH, there are two kinds of methods as well. As mentioned in the foregoing description, if the identifier of its own transmitted via the UL grant is a cell identifier, the user equipment attempts a reception of the PDCCH using the cell identifier of its own. If the identifier is a unique identifier, the user equipment attempts a reception of the PDCCH using a temporary C-RNTI included in the random access response. Thereafter, in the former case, if the user equipment receives the PDCCH (i.e., RACH MSG 4) via the cell identifier of its own before expiration of the contention resolution timer, the user equipment determines that the random access procedure has been normally performed and then ends the random access procedure. In the latter case, if the PDCCH is received via a temporary C-RNTI before expiration of the contention resolution timer, the user equipment checks data delivered on PDSCH indicated by the PDCCH. If the unique identifier of the user equipment is included in a content of the data, the user equipment determines that the random access procedure has been normally performed and then ends the random access procedure.

Figure 8:
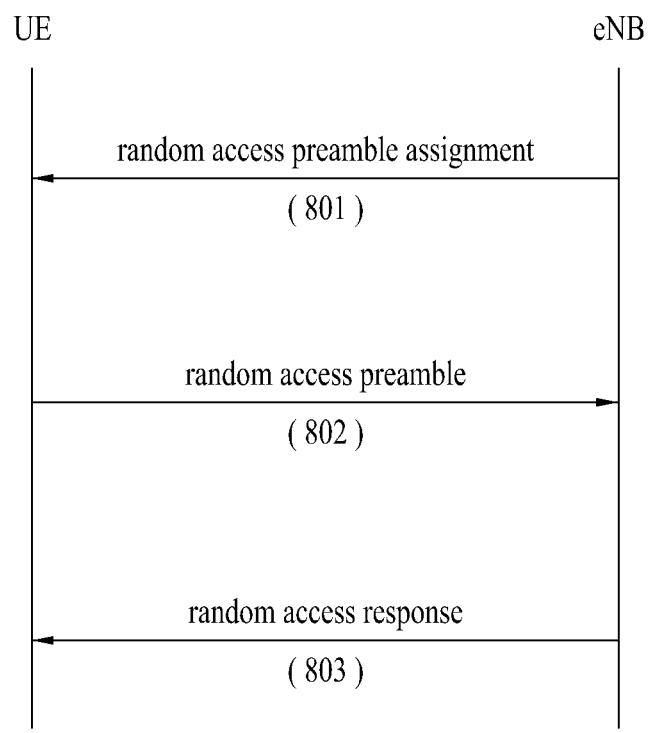
FIG. 8 is a diagram of an operating process between a user equipment (UE) and an eNode B (eNB) in a non-contention based random access procedure provided by LTE system.

FIG. 8 is a diagram of an operating process between a user equipment (UE) and an eNode B (eNB) in a non-contention based random access procedure provided by LTE system.

As mentioned in the foregoing description, unlike the contention based random access procedure, the non-contention based random access procedure judges that a random access procedure is successfully performed and ends the random access procedure in a manner of receiving random access response information. And, the non-contention based random access procedure can be performed in case of a handover procedure and in case that an eNode B makes a request for the non-contention based random access procedure. Of course, a contention-based random access procedure can be performed by the aforementioned two cases. First of all, it is important to receive a dedicated random access preamble including no possibility of contention from the eNode B to perform the non-contention based random access procedure. A handover command and a PDCCH command can indicate the random access preamble.

And, the eNode B can configure a PRACH resource, which will transmit the random access preamble by the user equipment. The PRACH resource includes a subframe and a frequency resource to be used by the user equipment for transmitting the random access preamble.

Table 1 shows a PRACH mask index that the eNode B configures the PRACH resource to the user equipment.

TABLE 1

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |

TABLE 1-continued

| PRACH Mask Index | Allowed PRACH (FDD) | Allowed PRACH (TDD) |
|---|---|---|
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity $1^{st}$ PRACH Resource Index in subframe | Every, in the time domain, even PRACH opportunity $1^{st}$ PRACH Resource Index in subframe |
| 12 | Every, in the time domain, odd PRACH opportunity $1^{st}$ PRACH Resource Index in subframe | Every, in the time domain, odd PRACH opportunity $1^{st}$ PRACH Resource Index in subframe |
| 13 | Reserved | $1^{st}$ PRACH Resource Index in subframe |
| 14 | Reserved | $2^{nd}$ PRACH Resource Index in subframe |
| 15 | Reserved | $3^{rd}$ PRACH Resource Index in subframe |

For instance, in case of FDD mode, the user equipment can transmit the random access preamble in one subframe among 10 subframes, the subframe of even number, or the subframe of odd number only according to the PRACH mask index of Table 1.

Referring to FIG. 8, the random access preamble designated to the user equipment only is assigned to the user equipment by the eNode B in the step S801 and then the user equipment transmits the preamble to the eNode B in the step S802. In the step S803, a method of receiving the random access response is identical to that of the contention-based random access procedure in FIG. 7.

In LTE-A system, a study on eICIC (enhanced Inter Cell Interference Coordination) is progressing to reduce interference between a first eNode B (eNB1) and a second eNode B (eNB2) in a heterogeneous network (HetNet). An ABS (almost blank subframe) is representatively considered for the study. A subframe designated as the ABS is configured to transmit a CRS only.

Figure 9:
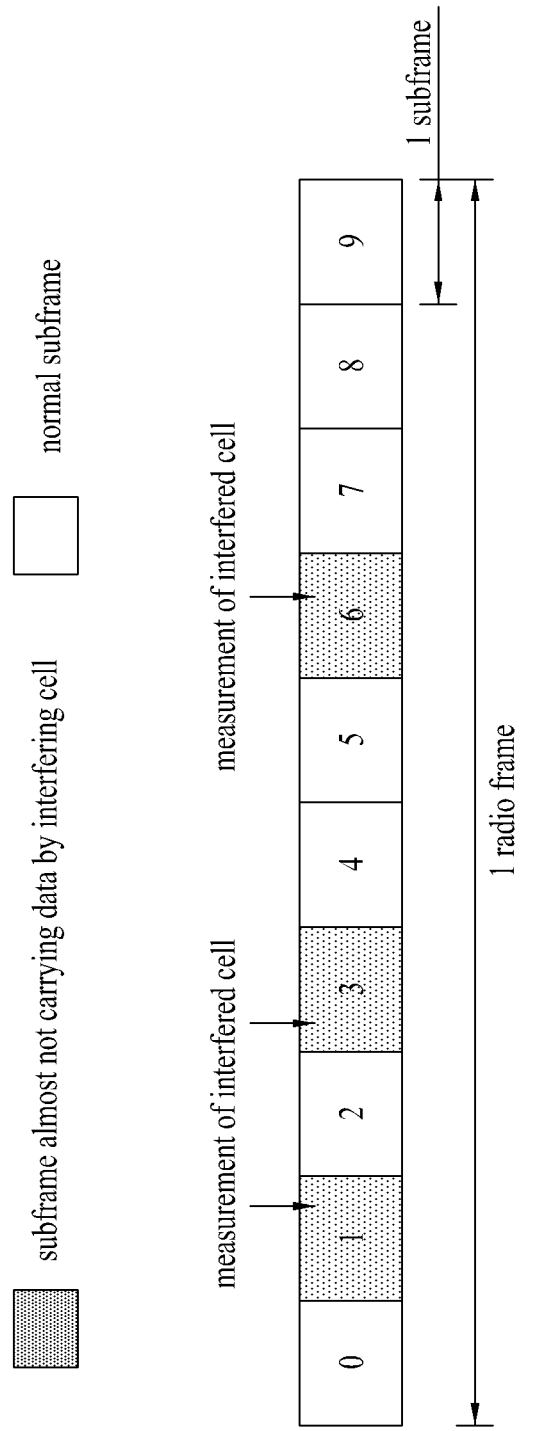
FIG. 9 is a diagram of an example to which an eICIC scheme is applied in time domain.

FIG. 9 is a diagram of an example to which an eICIC scheme is applied in time domain.

Referring to FIG. 9, an interfered cell performs a measurement in subframe index 1, 3, and 6. In this case, the subframe index 1, 3, and 6 indicate the subframes of which an interfering cell does not transmit a data and can indicate the ABS. Of course, it is preferable that the subframe designated as the ABS is configured to transmit CRS only.

Meanwhile, the eICIC scheme, which is designed for a user equipment in an RRC idle state in time domain, can be applied to a case of macro cell vs. femto cell and macro cell vs. pico cell. Specifically, a cell configuration considered in LTE-A system includes macro cell vs. femto cell, macro cell vs. pico cell, and the like. It is assumed that there is no information exchange via an X2 interface, which corresponds to an inter-cell interface, in the macro cell vs. femto cell and information exchange via the X2 interface is assumed to be feasible in the macro cell vs. pico cell.

First of all, a scenario of macro cell vs. pico cell is explained.

Figure 10:
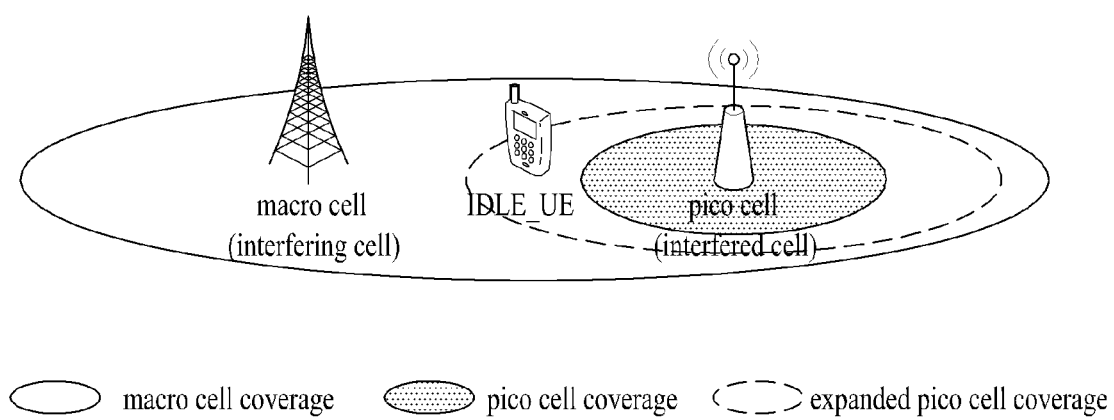
FIG. 10 is a diagram of a scenario of macro cell vs. pico cell to which an eICIC scheme is applied.

FIG. 10 is a diagram of a scenario of macro cell vs. pico cell to which an eICIC scheme is applied.

Referring to FIG. 10, a macro cell and a pico cell using an identical frequency resource are adjacent to each other and a user equipment in an RRC idle state is situated at a coverage of the pico cell. Yet, if a signal stronger than a signal from the pico cell is received from the macro cell, the user equipment selects the macro cell in the cell selection/reselection procedure.

In this case, by introducing the eICIC scheme in time domain for the purpose of coverage expansion of the pico cell, the user equipment can select and access not the macro cell but the pico cell in a manner of restricting a cell measurement subframe pattern of the user equipment to a specific subframe of less interference of the macro cell. In this case, the macro cell and the pico cell become an interfering (aggressor) cell and an interfered (victim) cell, respectively.

Subsequently, a scenario of macro cell vs. femto cell is explained.

Figure 11:
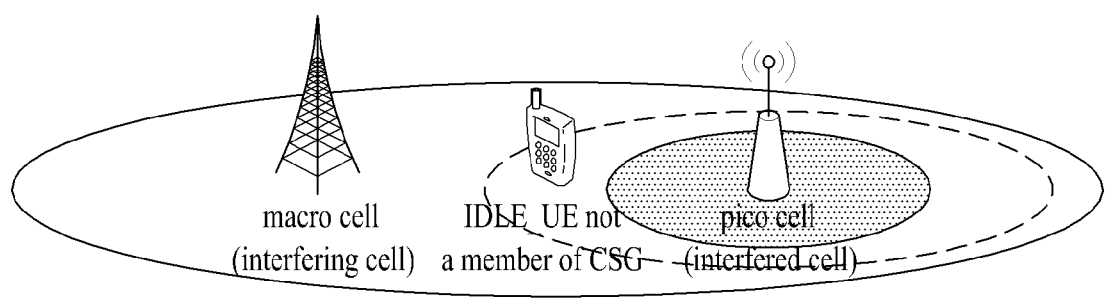
FIG. 11 is a diagram of a scenario of macro cell vs. femto cell to which an eICIC scheme is applied.

FIG. 11 is a diagram of a scenario of macro cell vs. femto cell to which an eICIC scheme is applied.

Referring to FIG. 11, a macro cell and a femto cell using an identical frequency resource are adjacent to each other. A user equipment, which is not a member of the femto cell, in an RRC idle state situating at a coverage of the femto cell may not find out a cell to establish an RRC connection, i.e., a suitable cell in the cell selection/reselection procedure due to a strong interference of the femto cell.

In this case, in order for the user equipment situating at the coverage of the femto cell to access the adjacent macro cell without interference of the femto cell, the cell measurement subframe pattern of the user equipment can be limited to a specific subframe of less interference of the femto cell in a manner of introducing the eICIC scheme in time domain. Hence, the user equipment can select and access the macro cell in the cell selection/reselection procedure. In this case, the macro cell and the femto cell become an interfered (victim) cell and an interfering (aggressor) cell, respectively.

In case that an interfered cell receiving strong interference from an adjacent interfering cell accesses a user equipment (hereinafter abbreviated an interfered UE) attempting to access a specific subframe of low transmit power of the interfering cell after performing a limited measurement, if a message (a random access response message or RRC connection request message), which is supposed to be transmitted to the interfered UE, is transmitted to not the specific subframe of low transmit power of the interfering cell but a normal subframe, the interfered UE may not receive the message from the interfered cell due to the strong interference of the interfering cell.

Hence, in order for the interfered UE attempting to access the interfered cell to receive a data necessary for accessing the interfered cell without the interference of the interfering cell, the interfered cell should transmit the data, which is supposed to be transmitted to the interfered UE, to the specific subframe of less interference of the interfering cell. Since the specific subframe of less interference of the interfering cell is limited, the interfered cell cannot transmit the message necessary for all user equipments attempting to access the interfered cell to the specific subframe. Hence, the interfered cell should be aware of whether the user equipment attempting to access the interfered cell corresponds to the interfered UE. Yet, in the present RRC connection procedure, the interfered cell is unable to know whether the user equipment attempting to access the interfered cell is the interfered UE.

Therefore, the present invention proposes a method of informing the interfered cell of whether the user equipment attempting to access the interfered cell is the interfered UE in the following description in order for the interfered cell to know whether the user equipment attempting to access the interfered cell is the interfered UE.

1) A method of informing the interfered cell of whether the user equipment is the interfered UE using a dedicated random access resource can be considered.

First of all, the interfered cell forms a dedicated random access resource for the interfered UE. The dedicated random access resource corresponds to a dedicated random access preamble and/or a dedicated PRACH resource. The interfered UE-dedicated random access preamble can be used by the interfered UE only and corresponds to a random access preamble capable of being transmitted by the interfered UEs only. Having received the interfered UE-dedicated random access preamble, the interfered cell is able to recognize that the user equipment transmitted the random access preamble corresponds to the interfered UE.

The interfered cell is able to form an interfered UE-dedicated PRACH resource. The interfered UE-dedicated PRACH resource corresponds to a subframe, a subframe pattern, or a frequency resource capable of transmitting a random access preamble by the interfered UE only. The interfered cell is able to aware that the user equipment transmitted the random access preamble to the interfered UE-dedicated PRACH resource corresponds to the interfered UE.

The interfered cell can transmit the random access resource information to system information to make UEs aware of the dedicated random access resource information.

If a cell measured by a subframe pattern limited to a specific subframe is selected in the cell selection/reselection procedure, the user equipment in an RRC idle state receives the interfered UE-dedicated random access resource information in a manner of receiving system information of the selected cell. If the user equipment in an RRC idle state already knows the interfered UE-dedicated random access resource information, this procedure can be omitted.

In performing a random access procedure, the user equipment in an RRC idle state transmits a random access preamble to the eNode B using the dedicated random access resource and then informs the eNode B that the user equipment has selected the cell in a manner of performing a measurement limited to the specific subframe.

2) Subsequently, a method of informing the interfered cell of whether the user equipment is the interfered UE using an RRC message of an RRC connection establishment procedure can be considered as well.

If a cell measured by a subframe pattern limited to a specific subframe is selected in the cell selection/reselection procedure, the user equipment in an RRC idle state makes an RRC message include an interfered UE indicator (Victim UE indicator (VUI)) indicating that the user equipment in an RRC idle state corresponds to the interfered UE in case of attempting to access the cell. The VUI has two kinds of values of TRUE/FALSE. It is also able to make a value to be judged according to the existence of the VUI. In particular, if the VUI exists, the value is judged as TRUE and if the VUI does not exist, the value is judged as FALSE.

Such information as a subframe pattern of the interfered cell measured by the user equipment and/or a cell indicator of the interfering cell strongly interfering the user equipment can be additionally included in the VUI.

Figure 12:
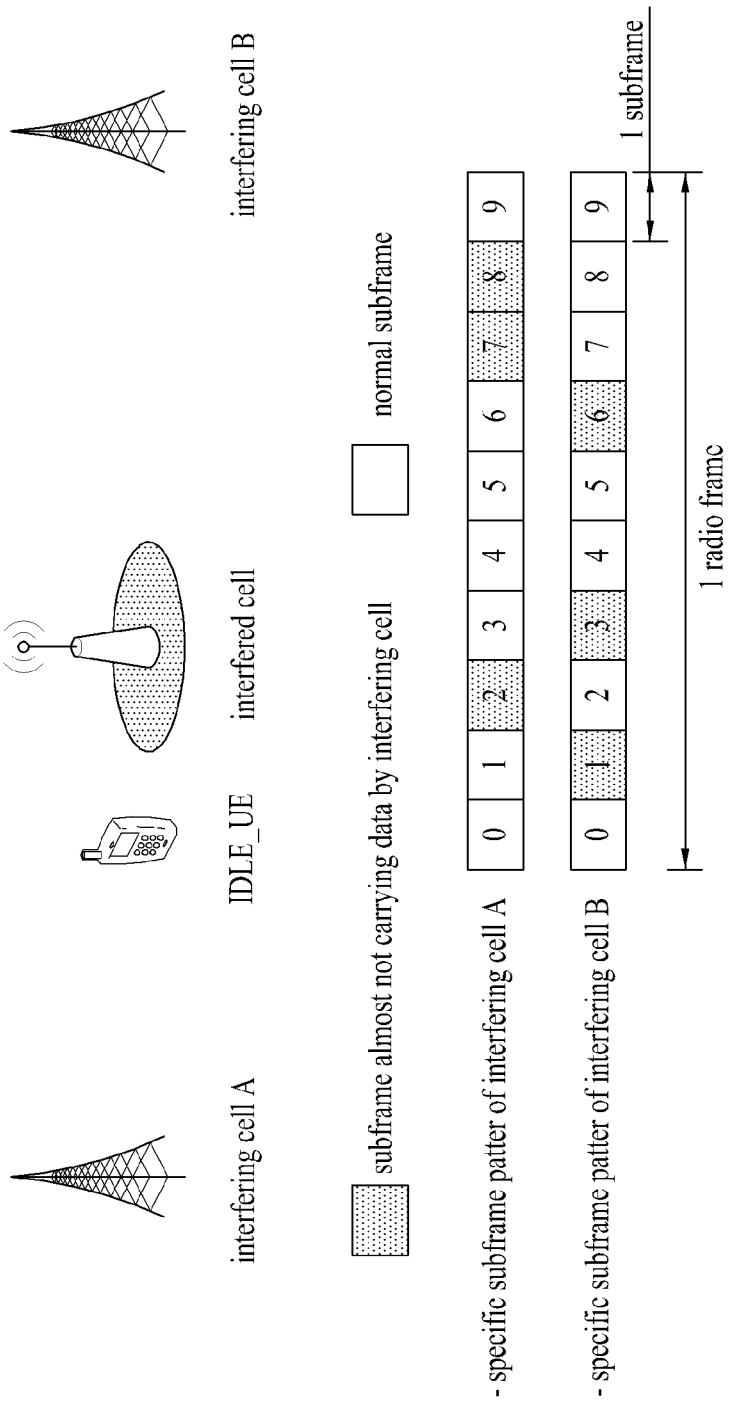
FIG. 12 is a diagram of examples of subframe patterns capable of being included in an interfered user equipment indicator of the present invention.

FIG. 12 is a diagram of examples of subframe patterns capable of being included in an interfered user equipment indicator of the present invention.

Referring to FIG. 12, an interfering cell A transmits an ABS in subframe index 2, 7, and 8 and an interfering cell B transmits the ABS in subframe index 1, 3, and 6. An interfering cell indicator of the present invention can include a cell indicator and subframe pattern information corresponding to the interfering cell A and the cell indicator and the subframe pattern information corresponding to the interfering cell B, respectively.

Hence, in case that a plurality of interfering cells exist in the vicinity of an interfered cell, it may be able to aware that which cell is strongly interfering the user equipment transmitted the VUI via the additional information of the interfered cell. By doing so, it is able to know how the interfered UE receives less interference if a data is transmitted to the corresponding user equipment via a certain subframe.

If the VUI of a user equipment attempting to access the interfered cell corresponds to TRUE, the interfered cell recognizes that the corresponding user equipment is the user equipment capable of being strongly interfered from the interfering cell. Or, by transmitting a data supposed to be transmitted to the corresponding user equipment to a specific subframe of less interference of the interfering cell, the corresponding user equipment can establish an RRC connection with the cell almost without the interference of the interfering cell.

The interfered UE can transmit the VUI to the interfered cell using an RRC connection request message or an RRC connection setup complete message.

Figure 13:
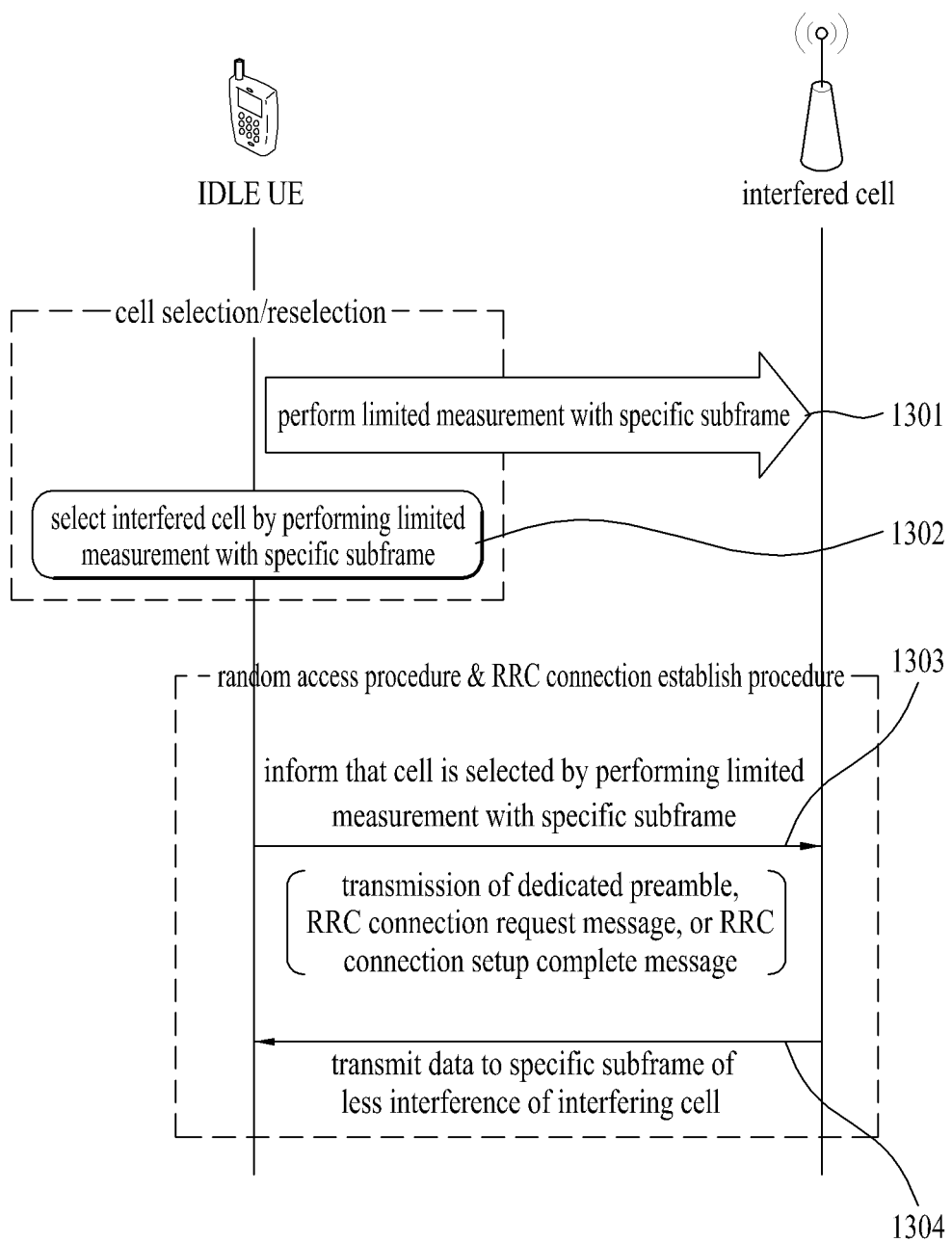
FIG. 13 is a signal flowchart for showing an operation indicating whether a user equipment in an RRC idle state according to embodiment of the present invention corresponds to an interfered user equipment.

FIG. 13 is a signal flowchart for showing an operation indicating whether a user equipment in an RRC idle state according to embodiment of the present invention corresponds to an interfered UE.

Referring to FIG. 13, a user equipment in an RRC idle state performs the cell selection/reselection procedure to establish an RRC connection. Specifically, the user equipment performs a limited measurement with a preconfigured specific subframe in the step S1301 and selects an interfered cell based on the measurement result in the step S1302.

Subsequently, the user equipment in an RRC idle state performs a random access procedure and an RRC connection procedure. In particular, the user equipment informs the interfered cell that a cell is selected by performing a limited measurement with the specific subframe in the step S1303. In particular, the user equipment informs the interfered cell that the user equipment is the interfered UE. In this case, a medium used to inform that the user equipment corresponds to the interfered UE can be implemented by transmitting the aforementioned dedicated preamble or an RRC message. The RRC message may correspond to the RRC connection request message or the RRC connection setup complete message. By performing the aforementioned procedures, the interfered cell can recognize that the user equipment attempting to access the interfered cell is the interfered UE.

Lastly, the interfered cell transmits a response message or a data to the interfered UE via the specific subframe of less interference of a neighboring cell in the step S1304 in response to the message transmitted in the step S1303.

Meanwhile, a cell corresponding to an object of measuring and a cell corresponding to an object of a measurement reporting may be different from each other. For instance, in an eNode B cooperative system, since the user equipment performs measurement for an adjacent cell and may be able to transmit a report for the measurement result to a serving cell.

The aforementioned interfered UE indication can be identically applied to a user equipment in an RRC connected state performing an RRC connection re-establishment procedure while an RRC connection is established with the interfered cell.

Specifically, the user equipment in an RRC connected state performing an RRC connection re-establishment procedure to the interfered cell can inform the interfered cell of whether the user equipment is the interfered UE as follows.

In case of using a dedicated random access resource, if the user equipment in an RRC connected state selects a cell measured by a subframe pattern limited to a specific subframe in the RRC connection re-establishment procedure, the user equipment in an RRC connected state receives system information of the selected cell and then receives the interfered UE-dedicated random access resource information. If the user equipment in an RRC connected state already knows the interfered UE-dedicated random access resource information, the system information receiving procedure can be omitted.

In performing a random access procedure to the cell, the user equipment informs the eNode B that the user equipment corresponds to the interfered UE in a manner of transmitting a random access preamble to the eNode B using the dedicated random access resource.

In case of using an RRC message, the interfered UE is able to inform the eNode B that the user equipment corresponds to the interfered UE in a manner of transmitting the VUI to the interfered cell using an RRC connection re-establishment request message.

Figure 14:
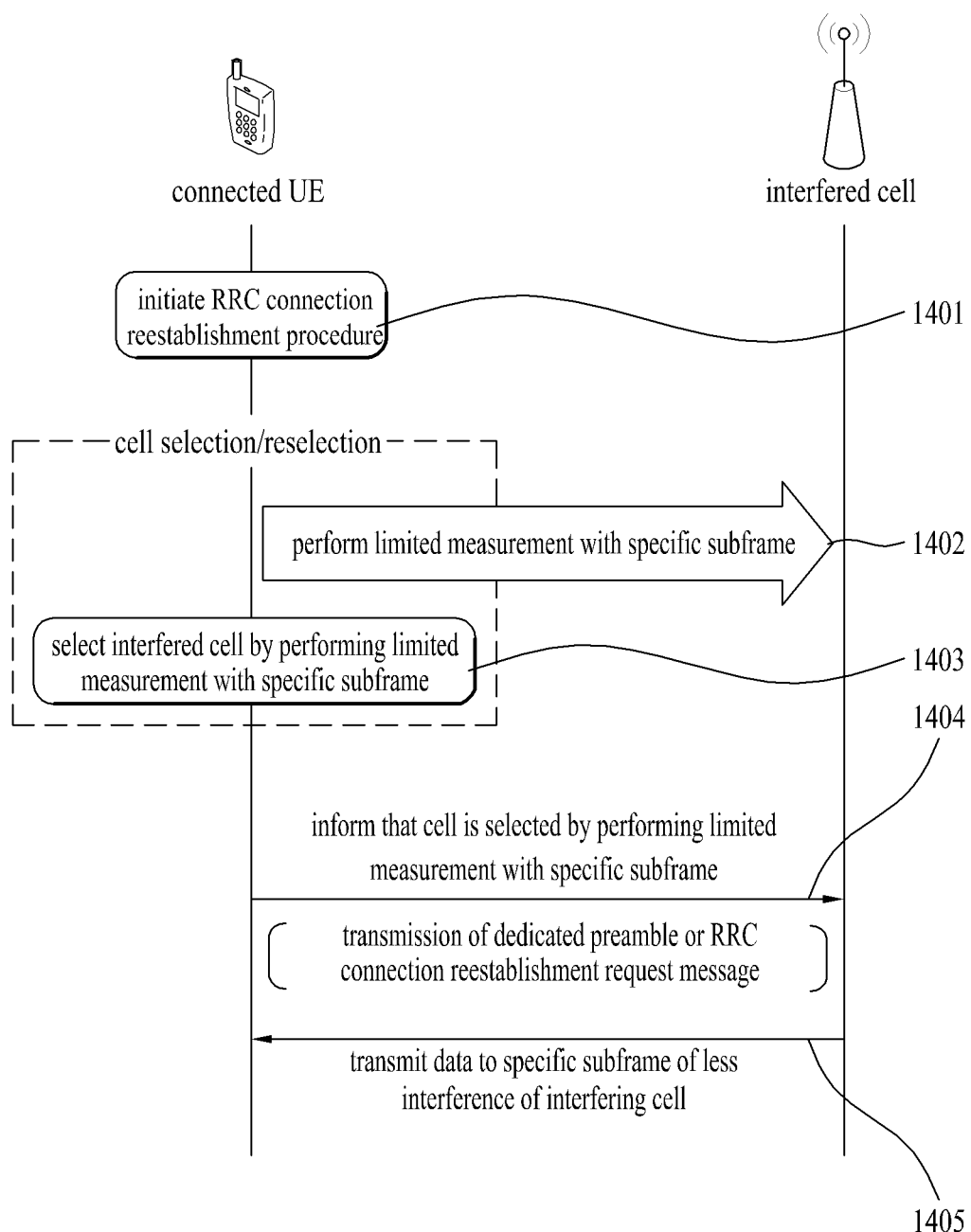
FIG. 14 is a signal flowchart for showing an operation indicating whether a user equipment in an RRC connected state according to embodiment of the present invention corresponds to an interfered user equipment.

FIG. 14 is a signal flowchart for showing an operation indicating whether a user equipment in an RRC connected state according to embodiment of the present invention corresponds to an interfered user equipment.

Referring to FIG. 14, the user equipment in an RRC connected state initiates the RRC connection re-establishment procedure in the step S1401 and performs the cell selection/reselection procedure. Specifically, the user equipment performs a limited measurement with a preconfigured specific subframe in the step S1402 and selects an interfered cell based on the measurement result in the step S1403.

Subsequently, the user equipment performs a random access procedure and an RRC connection establishment procedure. In particular, the user equipment informs the interfered cell that a cell is selected by performing the limited measurement with the specific subframe in the step S1404. In particular, the user equipment informs the interfered cell that the user equipment is the interfered UE. In this case, a medium used to inform that the user equipment corresponds to the interfered UE can be implemented by transmitting the aforementioned dedicated preamble or an RRC message. The RRC message may correspond to an RRC connection re-establishment complete message. By performing the aforementioned procedures, the interfered cell can recognize that the user equipment attempting to access the interfered cell is the interfered UE.

Lastly, the interfered cell transmits a response message or a data to the interfered UE via the specific subframe of less interference of a neighboring cell in the step S1405 in response to the message transmitted in the step S1404.

According to the present invention, in case that the user equipment attempts to access the interfered cell, strong interference received from the interfering cell can be reduced in a manner of informing the interfered cell of whether the user equipment corresponds to the interfered UE while an access is established between the interfered UE and the interfered cell.

Similarly, a cell corresponding to an object of measuring and a cell corresponding to an object of a measurement reporting may be different from each other. For instance, in an eNode B cooperative system, since the user equipment performs measurement for an adjacent cell and may be able to transmit a report for the measurement result to a serving cell.

Figure 15:
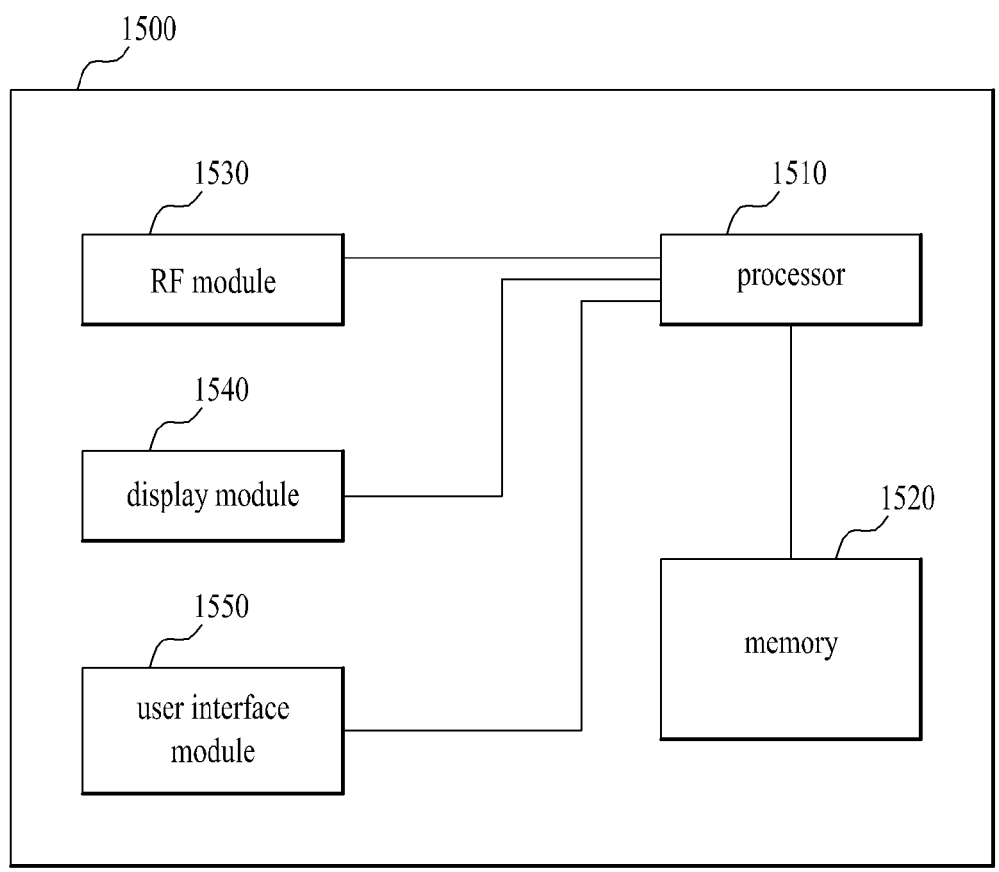
FIG. 15 is a block diagram for a configuration of a communication device according to one embodiment of the present invention.

FIG. 15 is a block diagram for a configuration of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of informations. And, the display unit 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of reporting measurement information of a user equipment in a wireless communication system and apparatus therefore are described with reference to examples applied to 3GPP LTE system, it may be applicable to various kinds of wireless communication systems as well as to the 3GPP LTE system.

What is claimed is:

1. A method for processing a signal by a user equipment in a wireless communication system, the method comprising:
   receiving information on a subframe pattern from an adjacent cell;
   selecting a cell according to measurement based on the subframe pattern, subframes designated to be measured by the user equipment in the subframe pattern corresponding to subframes to which data is not transmitted from the adjacent cell;
   transmitting a first message to the cell; and
   receiving a second message from the cell on one of the subframes designated to be measured,
   wherein the first message includes an indicator indicating that the measurement is performed based on the subframe pattern, and
   wherein the first message further includes information on the subframe pattern.

2. The method of claim 1, wherein the first message corresponds to one of: an RRC connection request message, an RRC connection setup complete message, and an RRC connection reestablishment complete message.

3. The method of claim 1, wherein the first message corresponds to a random access preamble defined by a UE-specific random access resource.

4. The method of claim 3, further comprising receiving information on the UE-specific random access resource from the cell.

5. The method of claim 1, wherein the second message corresponds to a response message for the first message or a data.

* * * * *